United States Patent [19]
Fujitsuka et al.

[11] Patent Number: 5,825,866
[45] Date of Patent: Oct. 20, 1998

[54] PRIVATE ELECTRONIC EXCHANGE APPARATUS HAVING A PLURALITY OF EXTENSION TERMINALS AND OFFICE LINE TERMINALS

[75] Inventors: Shuji Fujitsuka; Shinichi Honbou, both of Tokyo, Japan

[73] Assignee: Kabushiki Kaisha Toshiba, Kawasaki, Japan

[21] Appl. No.: 485,255

[22] Filed: Jun. 7, 1995

Related U.S. Application Data

[62] Division of Ser. No. 5,337, Jan. 19, 1993, abandoned.

[30] Foreign Application Priority Data

Jan. 21, 1992 [JP] Japan .......................................... 4-8370

[51] Int. Cl.[6] ............................. H04M 3/42; H04M 1/64; H04M 3/00
[52] U.S. Cl. ............................. 379/211; 379/88; 379/212; 379/246; 379/258
[58] Field of Search .............................. 379/88, 201, 210, 379/211, 212, 242, 245, 246, 258, 207, 229, 230, 231, 233

[56] References Cited

U.S. PATENT DOCUMENTS

| | | | |
|---|---|---|---|
| 4,899,373 | 2/1990 | Lee et al. ............................... | 379/207 |
| 4,956,861 | 9/1990 | Kondo ................................... | 379/211 X |
| 4,959,856 | 9/1990 | Bischoff et al. ........................ | 379/245 |
| 5,414,759 | 5/1995 | Ishikuri et al. ....................... | 379/211 X |

*Primary Examiner*—Harry S. Hong
*Attorney, Agent, or Firm*—Finnegan, Henderson, Farabow, Garrett & Dunner, L.L.P.

[57] ABSTRACT

An electronic exchange apparatus includes a plurality of extension circuits having terminals to which a plurality of extension terminals are connected, a memory table in which a plurality of extension numbers corresponding to the extension circuits are registered, and a control circuit for retrieving an extension number of a destination of an incoming signal from the memory table. The electronic exchange apparatus comprises a change request detector for detecting a change request signal supplied from one of the extension terminals to request a change in contents registered in the memory table, and a memory table changing section for changing the contents registered in the memory table, based on the change request signal detected by the change request detector and information supplied from the extension terminals and representing a content to be changed.

14 Claims, 6 Drawing Sheets

| EXTENSION NUMBER | PHYSICAL PORT NUMBER | LOGICAL PORT NUMBER |
|---|---|---|
| 1000 | 00 | 00 |
| 1001 | 01 | 01 |
| 1002 | 02 | 02 |
| | | |

~701

F I G. 1

| PHYSICAL PORT NUMBER | LOGICAL PORT NUMBER |
|---|---|
| 0 0 | 0 0 |
| 0 1 | 0 1 |
| 0 2 | 0 2 |
| ⋮ | ⋮ |

F I G. 2A

| PHYSICAL PORT NUMBER | LOGICAL PORT NUMBER |
|---|---|
| 0 0 | 0 2 |
| 0 1 | 0 1 |
| 0 2 | 0 0 |
| ⋮ | ⋮ |

F I G. 2B

| EXTENSION NUMBER | TRANSFER DESTINATION EXTENSION NUMBER |
|---|---|
| 1 0 0 0 | 1 0 0 2 |
| 1 0 0 1 | F F F F |
| 1 0 0 2 | 1 0 0 1 |
| ⋮ | ⋮ |

PRIVATE ELECTRONIC EXCHANGE APPARATUS HAVING A PLURALITY OF EXTENSION TERMINALS AND OFFICE LINE TERMINALS

This application is a division of application Ser. No 08/005,337, filed Jan. 19, 1993 (now abandoned).

BACKGROUND OF THE INVENTION

1. Field of the Invention

The present invention relates to a private electronic exchange apparatus for use in offices and enterprises.

2. Description of the Related Art In general, a private electronic exchange apparatus for use in an office and the like has a plurality of extension terminals and a plurality of office line terminals, and control between the extension terminals and between the extension and office line terminals is performed in accordance with an extension port number registration table. This table stores a plurality of physical port numbers allotted to the respective extension terminals and a plurality of logical port numbers corresponding to the respective physical port numbers. When a signal is received, the electronic exchange apparatus retrieves one of the extension terminals of the physical port numbers corresponding to the logical port numbers stored in the extension port number registration table, thereby processing the incoming signal.

The relationship in correspondence between the physical port numbers and the logical port numbers stored in the table can arbitrarily be changed. When a user of an extension telephone transfers to use an extension terminal of another physical (or logical) port, he or she can use the same number as that of the extension telephone if the physical (logical) port number is changed to the originally-used physical port number.

When the user of the extension telephone transfers as described above, a logic port number stored in the extension port number registration table is changed by a maintenance man (hereinafter referred to as an operator) of the electronic exchange apparatus, using a specific managing terminal having a function of modifying the contents of the extension port number registration table. Since, therefore, the operator has to start the managing terminal whenever a logic port number is changed, it takes a lot of time and labor to change the logic port number. In addition, the logic port number cannot be changed when the operator is absent.

The conventional electronic exchange apparatus described above has an extension transfer function. This extension transfer function is carried out as follows. The electronic exchange apparatus includes a transfer destination number registration table for storing extension numbers of transfer destination extension terminals in correspondence with those of the extension terminals. When a user of the extension telephone wishes for a transfer because of his or her transfer to another place, the user dials the extension telephone to input a transfer registration special number indicative of a requirement for transfer registration and an extension number of a new extension telephone of the transfer destination. The extension number of the transfer destination is thus stored in the transfer destination extension number registration table. When a signal is received, the electronic exchange apparatus determines whether a transfer mode is set in the extension terminals or not and, if it is set, the received signal is transferred to another predetermined extension terminal.

When the user of the extension telephone, who registered the transfer in the transfer destination extension number registration table, transfers to still another place, if the user wishes to change the extension number of the transfer destination again, the user has to return to his or her original extension telephone. Such a repetitive operation is very troublesome. Since, furthermore, the user has to always grasp the extension number of the extension telephone of the transfer destination in order to register/change transfer information as described above, it is troublesome for the user to change the extension number.

SUMMARY OF THE INVENTION

An object of the present invention is to provide an electronic exchange apparatus capable of a change in processing of an incoming signal, such as a change in extension number and a transfer registration using every extension terminal. More specifically, an object of the present invention is to provide an electronic exchange apparatus capable of changing an extension number of each extension terminal, without using a specific managing terminal, and registering a desired transfer using every extension terminal as well as an extension terminal on the original.

According to one aspect of the present invention, there is provided an electronic exchange apparatus including a plurality of extension circuits having terminals to which a plurality of extension terminals are connected, a memory table in which a plurality of extension numbers corresponding to the plurality of extension circuits are registered, and a control circuit for retrieving an extension number of a destination of an incoming signal from the memory table to process the incoming signal, comprising:

a change request detector for detecting a change request signal supplied from one of the plurality of extension terminals to request a change in contents registered in the memory table; and a memory table changing section for changing the contents registered in the memory table, based on the change request signal detected by the change request detecting means and information supplied from the extension terminals and representing a content to be changed.

According to another aspect of the present invention, there is provided an electronic exchange apparatus including a plurality of extension circuits having terminals to which a plurality of extension terminals are connected, a memory table in which a plurality of extension numbers corresponding to the plurality of extension circuits are registered, and a control circuit for retrieving an extension number of a destination of an incoming signal from the memory table to process the incoming signal, comprising:

a change request detector for detecting a change request signal supplied from one of the plurality of extension terminals to request a change in contents registered in the memory table; and a memory table changing controller for, when the change request signal is detected by the change request detecting means, changing the contents registered in the memory table, based on the change request signal and information supplied from the extension terminals and representing a content to be changed.

According to still another aspect of the present invention, there is provided an electronic exchange apparatus including a plurality of extension circuits having terminals to which a plurality of extension terminals are connected, a transfer memory table for selectively storing extension number information representing a transfer destination of an incoming signal in correspondence with the plurality of extension circuits, and a control circuit for retrieving an extension number of the transfer destination of the incoming signal from the memory table, comprising:

a determining section for, when a transfer registration request signal for requesting a transfer registration including extension number information is detected from at least one of the plurality of extension terminals, determining whether the transfer registration request signal is a signal generated from an extension terminal of a transfer destination; and a transfer registration controller for, when the determining section determines that the transfer registration request signal is a signal generated from the extension terminal of the transfer destination, registering extension number information of the extension terminal from which the transfer registration request signal is generated, in the transfer memory table in correspondence with an extension terminal represented by the extension number information included in the transfer registration request signal.

Since the electronic exchange apparatus of the present invention can be so designed as to detect a request for changing in the contents registered in the memory table from one of the extension terminals and to change the contents of the memory table by the request, the logical port numbers can be changed from every extension terminal. Therefore, a dedicated managing terminal is not necessary for changing the logical port numbers, and a transfer operation and the like can be performed by every extension terminal, with the result that an operator of the managing terminal is unnecessary and a complicated operation is lessened.

More specifically, when a request for change in the extension number stored in the memory table for each of extension terminals and an extension number to be changed as change information are input, the input extension number is stored in a memory area of the memory table corresponding to the extension terminal which is requested to change, and an extension number of the extension terminal which is requested to change is stored in a memory area of the memory table corresponding to the extension terminal to be changed. Therefore, a user who is changing in registration of extension number because of his or her transfer, is able to register/change the extension numbers by inputting the extension numbers using the extension terminal on the origin or destination. Therefore, the user does not have to operate a managing terminal when the extension number is registered or changed, and he or she can do it easily even when an operator of the managing terminal is absent.

Furthermore, when a transfer registration request comes from the extension terminal on the transfer destination, an extension number of the extension terminal by which the request is made is stored in a memory area of a transfer memory table corresponding to extension number information included in the transfer registration request. Thus, the user can perform the transfer registration from the extension terminal on the transfer destination. When a user of an extension terminal wishes to continuously perform a transfer registration, he or she does not have to return to the extension terminal on the origin. Therefore, the exchange apparatus is very convenient. Since the transfer registration can be performed from the transfer destination, the user does not have to input the extension number of the extension terminal on the destination. Therefore, the user has only to know the extension number of the extension terminal on the destination as extension number information, and the operability of the apparatus for transfer registration is improved.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Figure 1:
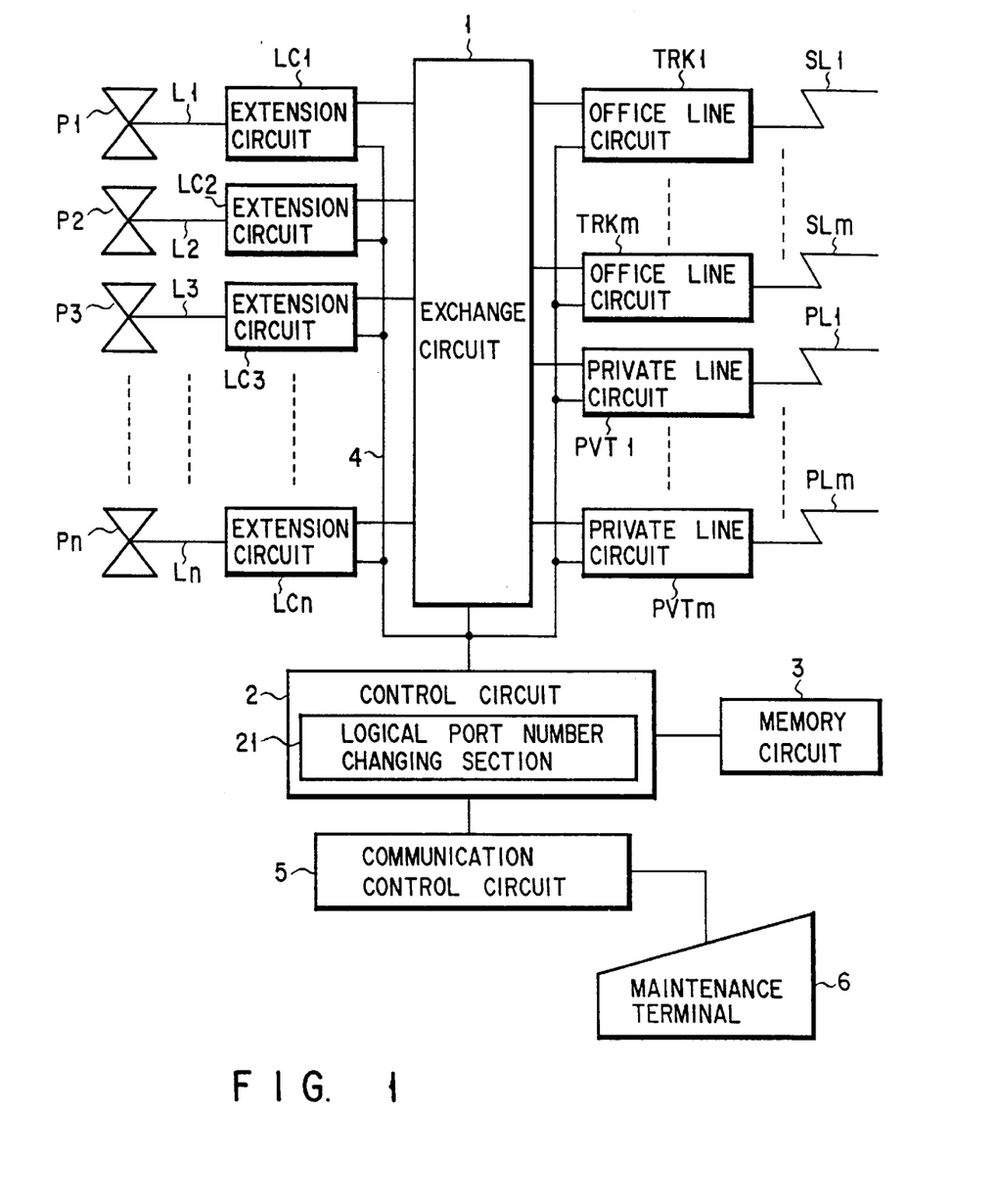
FIG. 1 is a block diagram showing a constitution of an electronic exchange apparatus according to a first embodiment of the present invention.

FIG. 1 is a block diagram schematically showing a constitution of an electronic exchange apparatus according to a first embodiment of the present invention. The electronic exchange apparatus comprises an exchange circuit 1, a control circuit 2, a memory circuit 3, extension circuits LC1 to LCn, office line circuits TRK1 to TRKm, private line circuits PVT1 to PVTm, and a control data bus line 4 for transmitting various types of control signals between the control circuit 2 and the office and private line circuits. A maintenance terminal 6 is connected to the control circuit 2 via a communication control circuit 5.

Extension telephones P1 to Pn are connected at their extension terminals L1 to Ln to the extension circuits LC1 to LCn, respectively. Trunk lines SL1 to SLm are connected to the office line circuits TRK1 to TRKm, and private lines PL1 to PLm are connected to the private line circuits PvT1 to PVTm. The extension circuits LC1 to LCn, office line circuits TRK1 to TRKm, and private line circuits PVT1 to PVTm monitor the states of the extension terminals L1 to Ln, office lines SL1 to SLm, and private lines PL1 to PLm, respectively, and transmit/receive control information to/from the control circuit 2, thereby controlling a predetermined line.

The exchange circuit 1 exchanges the extension circuits LC1 to LCn, and the office line circuits TRK1 to TRKm and private line circuits PVT1 to PVTm with each other in accordance with an operation of the control circuit 2, and also exchanges the extension circuits LC1 to LCn with each other.

Figure 2A:
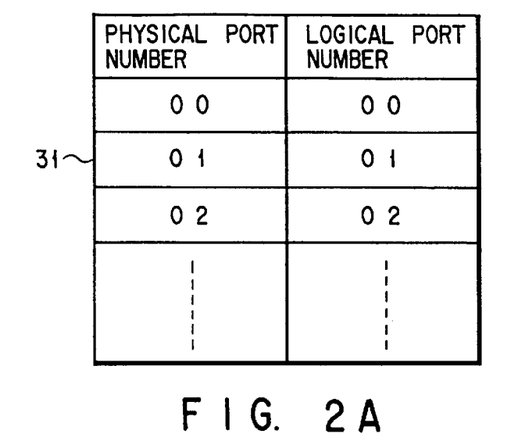
FIGS. 2A and 2B are views of port number registration tables of a memory circuit of the electronic exchange apparatus shown in FIG. 1.
Figure 2B:
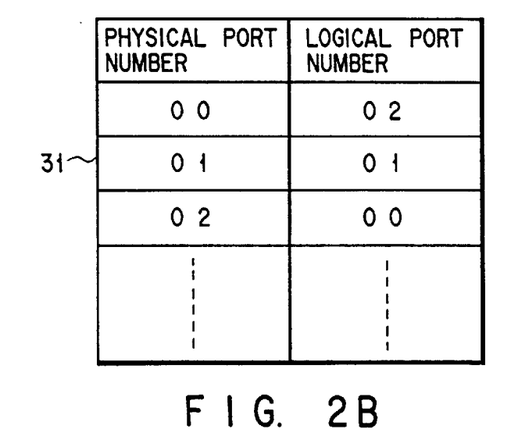

The memory circuit 3 includes a port number registration table 31 for storing logical port numbers corresponding to physical port numbers allotted to the extension terminals L1 to Ln, as shown in FIGS. 2A and 2B.

The control circuit 2 controls a normal exchange such as control of outgoing and incoming signals, and includes a logical port number changing section 21. The logical port number changing section 21 receives a logical port number changing special number for requesting a change in the logical port numbers after the off-hook of the extension telephones P1 to Pn is detected and then a logical port number. In this case, the logical port number changing section 21 stores the logical port number in the port number registration table 31 of the memory circuit 3 so as to correspond with a physical port number of the extension terminal in which the change in the logical port number is requested.

The control circuit 2 has a function of ringing at an extension terminal of a physical port number corresponding to a logical port number of the extension terminal, on the basis of information stored in the port number registration table 31, when a signal is received by the extension terminal.

The maintenance terminal 6 monitors/maintains the electronic exchange apparatus, and supplies a control signal for changing a logical port number registered in the port number registration table 31 to the control circuit 2 through the communication control circuit 5.

Figure 3:
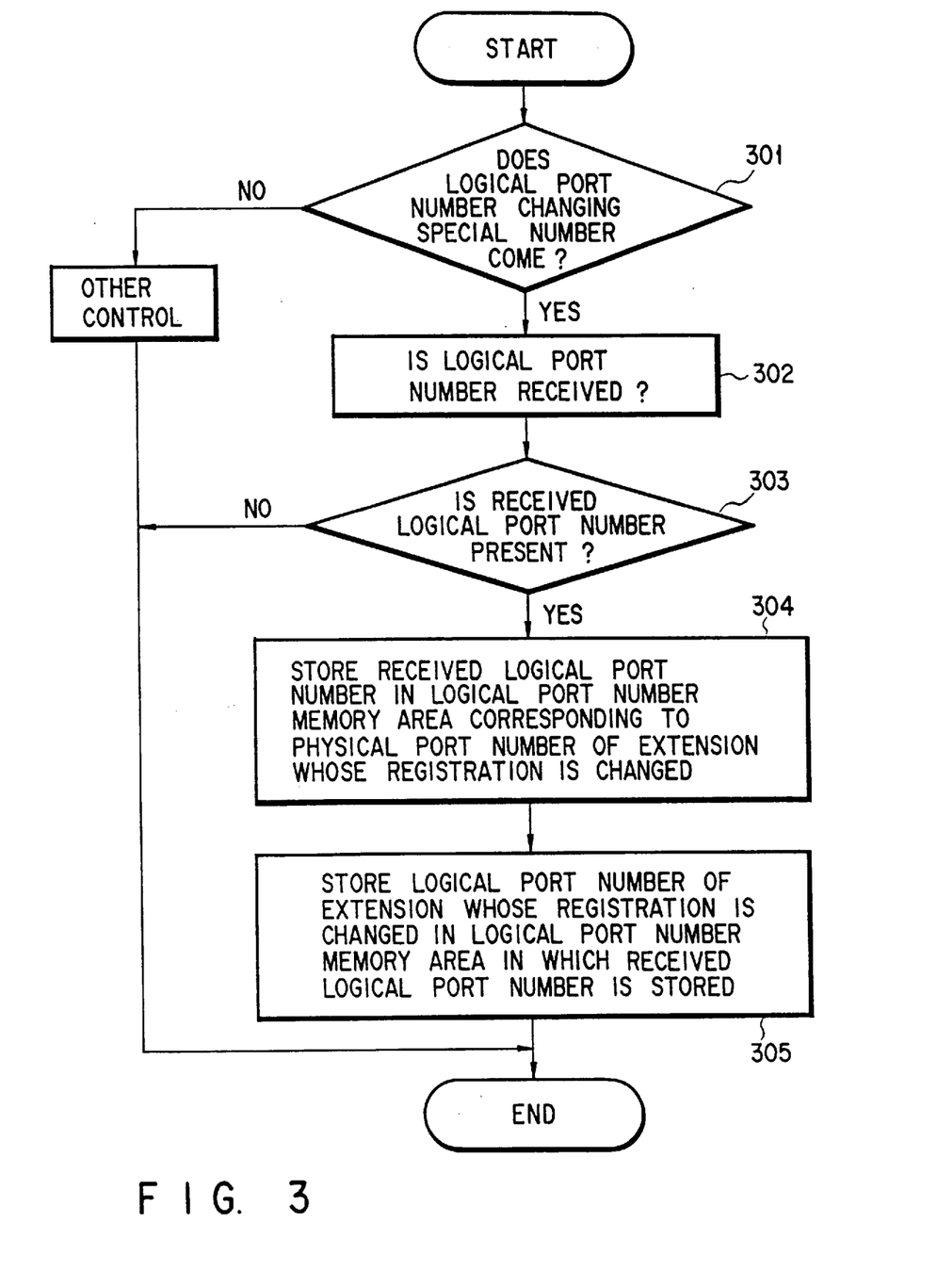
FIG. 3 is a flowchart showing a control process and control contents of a control circuit of the electronic exchange apparatus shown in FIG. 1.

An operation of the electronic exchange apparatus having the above constitution will be described, with reference to FIG. 3.

According to the first embodiment, when a user of an extension telephone P1 transfers and changes it to another extension telephone P3, an operation for changing a logical port number of extension terminal L3 to a logical port number of extension terminal L1 is performed by the extension telephone P3. This operation will be described. Assume that the physical port numbers of extension terminals L1 and L3 are "00" and "02", respectively.

Before the user transfers, the logical port numbers stored in the table 31 in correspondence with the physical port numbers "00" and "02" are "00" and "02", respectively, as shown in FIG. 2A, and, in other words, the port number of the extension telephone P1 is set to "00" and that of the extension telephone P3 is set to "02".

Assuming in the above state that a user of the extension telephone P3 performs an off-hook of the extension telephone P3 in order to change the logical port number, the off-hook is detected by the extension circuit LC3 through the extension terminal L3, and the extension circuit LC3 transmits an outgoing signal to the control circuit 2 through the control data bus line 4. Upon detection of the off-hook of the extension telephone P3, the control circuit 2 instructs the extension circuit LC3 to respond to the outgoing signal through the control data bus line 4. Thus, a dial tone is sent out from the extension circuit LC3 to the extension telephone P3 through the extension terminal L3.

When the dial tone is sent, the user inputs a logical port number changing special number indicative of a requirement for changing a logical port number using a dial of the extension telephone P3. After a dial signal corresponding to the logical port number changing special number is detected, the physical port number "02" of the extension telephone P3 is added to the logical port number changing special number in the extension circuit LC3, and the new number is supplied to the control circuit 2.

The control circuit 2 monitors whether a logical port number changing special number has come from each of the extension telephones (step 301). On detecting that a logical port number changing special number has come from the extension telephone P3, the control circuit 2 temporarily stores a physical port number "02" as well as the logical port number changing special number. If the user inputs from the extension telephone P3 the logical port number "00" of the extension terminal which was used in the extension telephone P1 before the user transfers, the control circuit 2 receives the logical port number "00"(step 302), and then checks whether there is an extension terminal corresponding to the logical port number "00". If the presence of such an extension terminal is confirmed, the control circuit 2 causes the logical port number "00" to be stored in a logical port number memory area corresponding to the physical port number "02" of the extension terminal in the port number registration table 31 of the memory circuit 3 (step 304). Then, a logical port number "02" stored in a memory area corresponding to the extension terminal L3 (physical port number "02") before the registration is changed, is stored in a logical port number memory area corresponding to the extension terminal L1 (logical port number "00") (step 305).

In order to change a logical port number using an extension telephone which was originally used by a user who has transferred, the following operation is performed.

The user inputs a logical port number changing special number after an off-hook of the extension telephone P1. After a dial signal corresponding to the logical port number changing special number is detected by the extension circuit LC1, the physical port number "00" of the extension telephone P1 is added to the special number in the extension circuit LC1, and then the new number is supplied to the control circuit 2. The control circuit 2 monitors whether a logical port number changing special number has come from each of the extension telephones (step 301), as in the above-described operation for changing the logical port number by using the extension telephone P3 on the user's destination. Upon detecting that a logical port number changing special number has come from the extension telephone P1, the control circuit 2 temporarily stores the physical port number "00" as well as the special number.

When the user inputs from the extension telephone P1 a logical port number "02" of the extension terminal to be used after he or she transfers, the control circuit 2 receives the logical port number "02" and then confirms that there is an extension terminal corresponding to the logical port number "02". Then, the physical port number "02" received by the control circuit 2 is stored in a logical port number memory area corresponding to the physical port number "00" whose registration is changed in the table 31 of the memory circuit 3. During the change in registration, a logical port number "00" of the extension terminal L1 is stored in the logical port number memory area in which the logical port number "02" has been stored.

When a dial signal other than the dial signal corresponding to the logical port number changing special number comes in the step 301, the control circuit 2 performs another predetermined operation.

FIG. 2B shows the port number registration table 31 which is changed by the foregoing logical port number changing operation. Referring to the table 31, the control circuit 2 processes an incoming signal while setting the extension telephone P1 to the logical port number "02" and setting the extension telephone P3 to the logical port number "00".

In the first embodiment described above, when a logical port number changing special number is input and then a logical port number of an extension terminal to be changed is input, the logical port number is stored in the logical port number memory area of the port number registration table 31 corresponding to a physical port number of the extension terminal whose registration is changed, and a logical port number of the extension terminal whose registration is changed is stored in the logical port number memory area of the table 31 corresponding to the extension terminal to be changed. Therefore, a user can change a logical port number by inputting the logical port number changing special number and the logical port number, using an extension telephone on the user's origin or destination.

Figure 7:
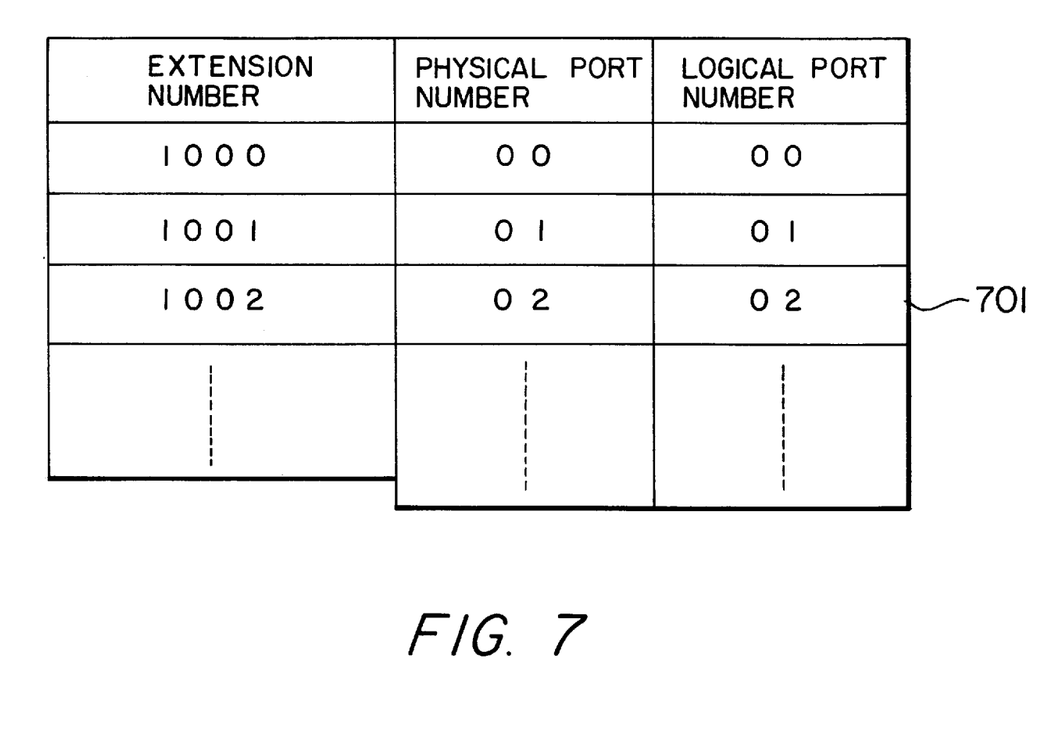
FIG. 7 illustrates a memory table including logical port number, physical port numbers and extension numbers in accordance with the present invention.

The user can change the logical port number without using a specific managing terminal, and can also do it even when an operator of the managing terminal is absent. For example, as shown in FIG. 7, the logical port number of the extension terminal to be requested to change and that of the extension terminal to be changed are exchanged and stored, and there occurs no drawback in which the same logical port numbers are dually registered in the logical port number memory area of the port number registration table 31.

In the first embodiment, the logical port number can be changed only by the logical port number registering special number and the logical port number. However, in order to prevent the user from changing the logical port number too frequently, a password can be input after the logical port number registering special number is input so that only the manager can change the logical port number.

Figure 4:
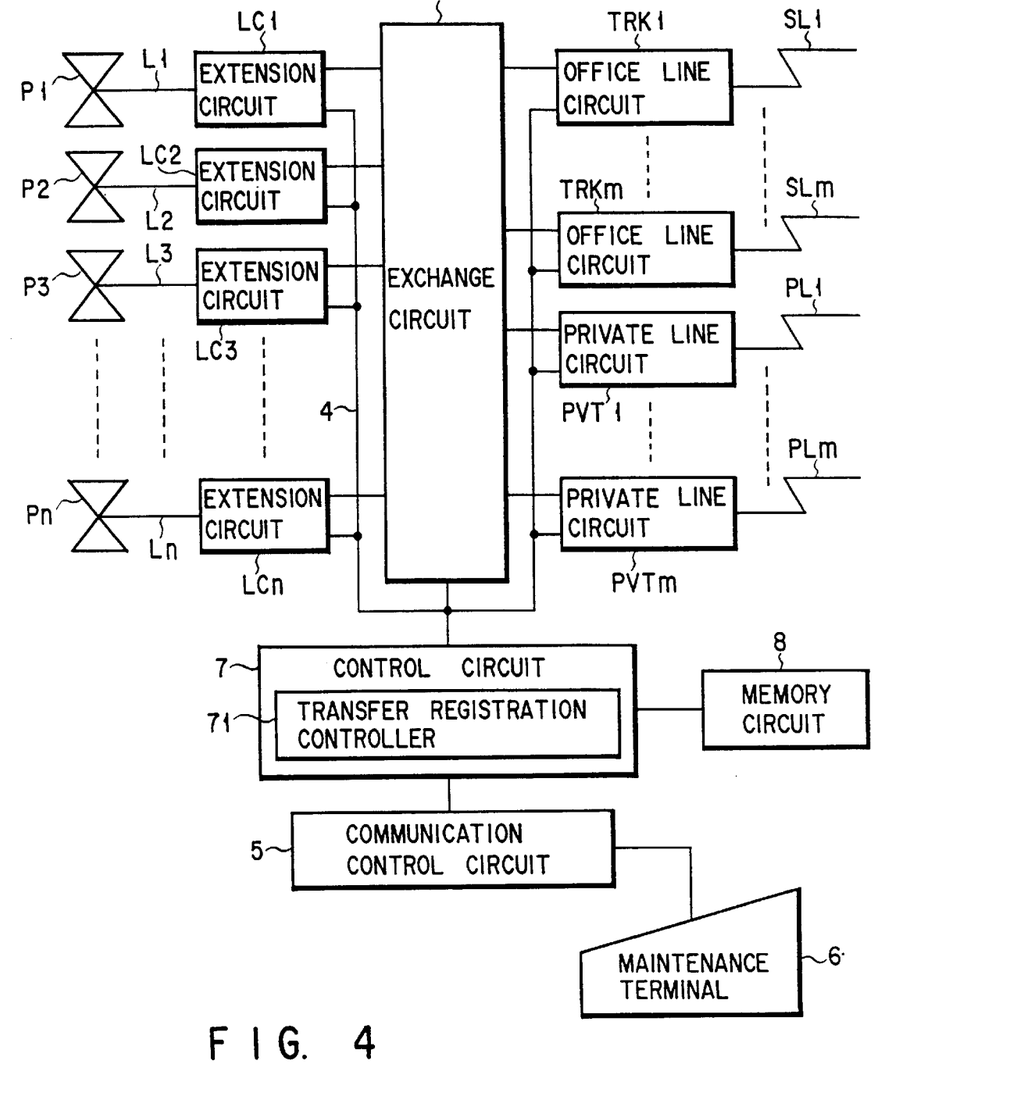
FIG. 4 is a block diagram showing a constitution of an electronic exchange apparatus according to a second embodiment of the present invention.

FIG. 4 is a block diagram schematically showing a constitution of an electronic exchange apparatus according to a second embodiment of the present invention. In FIG. 4, the same components as those of FIG. 1 are denoted by the same reference numerals, and their detailed descriptions are omitted.

Figure 5:
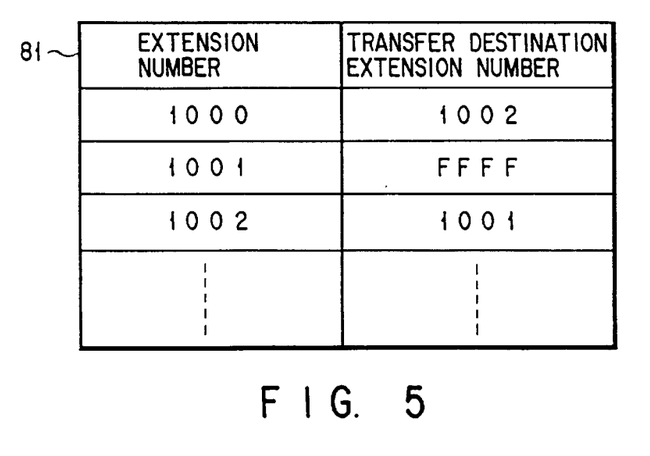
FIG. 5 is a view of a transfer destination extension number registration table of a memory circuit of the electronic exchange apparatus shown in FIG. 4.

A memory circuit 8 shown in FIG. 4 has a destination extension number registration table 81 for storing destination extension numbers corresponding to extension numbers allotted to extension telephones P1 to Pn, as shown in FIG. 5. In FIG. 5, "FFFF" indicates that no destination extension numbers are registered.

A control circuit shown in FIG. 4 performs normal exchange control such as control of outgoing and incoming signals, and includes a transfer registration controller 71. After the off-hook of the extension telephones P1 to Pn is detected, the transfer registration controller 71 checks whether a special number requesting transfer registration from the origin is input or not, and also checks whether a special number requesting transfer registration from the destination. If the special number requesting the transfer registration from the origin is input and then the extension number of an extension telephone on the destination is input, the input extension number is stored in the destination extension number registration table 81 of the memory circuit 8 in correspondence with an extension number of an extension telephone on the origin. If the special number requesting the transfer registration from the destination is input and then the extension number of the extension telephone on the origin is input, the extension number of the extension telephone on the destination is stored in the table 81 in correspondence with the input extension number of the extension telephone on the origin.

The control circuit 7 has a function of, when an incoming signal is received by the extension terminal through which the transfer is registered, instructing an extension circuit on the destination to transmit a ringing signal on the basis of information stored in the destination extension number registration table 81 and, when the extension circuit on the destination responds to the ringing signal, controlling a connection between the destination and the origin to go into a speaking state.

An operation of the electronic exchange apparatus having the above constitution will be described. A case will be described in which, when a user of the extension telephone P1 moves and uses the extension telephone P3, he or she registers a transfer of a signal received by the extension telephone P1 to the extension telephone P3 using the extension telephone P1.

Assume that extension numbers allotted to the extension telephones P1 and P3 are "1000" and "1002", respectively, and that the user dials a transfer registering special number requesting the transfer registration after the off-hook of the extension telephone P1 by which the transfer is registered. After a dial signal corresponding to the transfer registering special number is detected by the extension circuit LC1 through the extension terminal L1, the extension number "1000" of the extension telephone P1 is added to the special number in the extension circuit LC1 and the new number is supplied to the control circuit 7.

Figure 6:
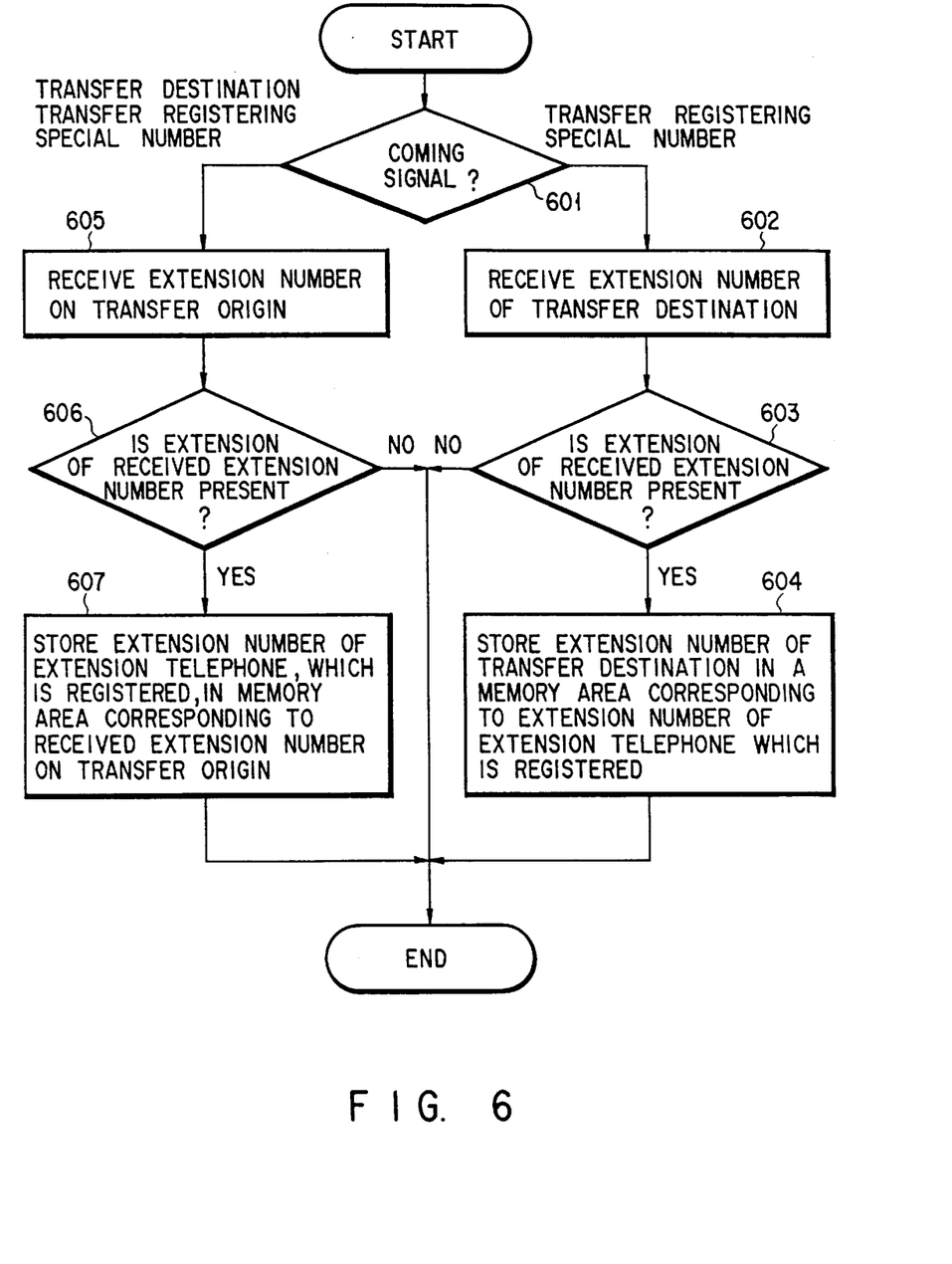
FIG. 6 is a flowchart showing a control process and control contents of a control circuit of the electronic exchange apparatus shown in FIG. 4.

The control circuit 7 determines a type of a signal coming from each of the extension telephones (step 601 in FIG. 6). When the control circuit 7 determines that a transfer registering special number has come from the extension telephone P1, the extension number "1000", which has come along with the special number, is temporarily stored. If the user inputs the extension number of the destination of the user, that is, the extension number "1002" of the extension telephone P3 from the extension telephone P1, the control circuit 7 receives the destination extension number (step 602) and then checks whether there is an extension terminal corresponding to "1002"(step 603). If the presence of such an extension terminal is confirmed, the control circuit 7 causes the destination extension number "1002" to be stored in a memory area corresponding to the extension number "1000" of the extension telephone P1 by which the transfer was registered in the destination extension number registration table 81 (step 604).

If the transfer registration is performed as described above, the signal received by the extension telephone P1 is then transferred and the extension terminal of the extension telephone P3 is called.

A case will be described in which a user of the extension telephone P1 registers a transfer of an incoming signal received by the extension telephone P1 to the extension telephone P3 using the extension telephone P3.

The user dials a transfer registering special number requesting the transfer registration after the off-hook of the extension telephone P3 by which the transfer is registered. After a dial signal corresponding to the transfer registering special number is detected by the extension circuit LC3, the extension number "1002" of the extension telephone P3 is added to the special number in the extension circuit LC3 and the new number is supplied to the control circuit 7.

The control circuit 7 determines a type of a signal coming from each of the extension telephones, as described above. When the control circuit 7 determines that a transfer registering special number has come from the extension telephone P3, the extension number "1002", which has come along with the special number, is temporarily stored. If the user inputs the extension number of the origin of the user, that is, the extension number "1000" of the extension telephone P1 from the extension telephone P3, the control circuit 7 receives the origin extension number (step 605) and then checks whether there is an extension terminal corresponding to "1000"(step 606). If the presence of such an extension terminal is confirmed, the control circuit 7 causes the destination extension number "1002" of the extension telephone by which the transfer was registered, to be stored in a memory area corresponding to the extension number "1000" of the extension telephone P1 in the destination extension number registration table 81 (step 607).

The signal received by the extension telephone P1 is transferred and the extension terminal of the extension telephone P3 is called.

In the second embodiment described above, when a destination transfer registering special number requesting the transfer registration from the destination is input and then an extension number of an extension telephone on the origin is input, an extension number allotted to an extension telephone on the destination is stored in correspondence with the extension number of the extension telephone on the origin. In other words, a user is able to perform a desired transfer registration using the extension telephone not on the origin but on the destination by inputting the destination transfer registering special number and the extension number of the extension telephone on the origin. Therefore, when the user of the extension telephone changes his or her destination, he or she does not have to return to the extension telephone on the origin. If the transfer registration is performed by the extension telephone on the destination as described above, the user has only to know the transfer registering special number of the destination and the extension number of the extension telephone on the origin, that is, the extension number of the user's own extension telephone. The operability of the apparatus for transfer registration is thus improved.

The present invention is not limited to the above embodiments. In the above embodiments, when a change in logical port number is requested or when a registration of a transfer number is requested, a preset special number is dialed and then an extension number is dialed. However, these requests can be executed by inputting speech information and detecting it using a speech recognition technique.

Furthermore, a change in extension number is described as the first embodiment, and a change in transfer registration is described as a second embodiment separately from the first embodiment. Both the functions of the first and second embodiments can be combined with each other. The memory table can include the logical port numbers, physical port numbers, extension numbers, and extension numbers on the destination, as both the functions of the first and second embodiments. The logical port number changing section of the first embodiment and the transfer registration controller of the second embodiment are used in common, and the change in logical port number or the transfer registration can be selected in accordance with a type of a special number.

Moreover, the extension terminals are able to carry out the functions which were conventionally performed by the managing terminals, as well as the functions of changing and transferring the logical port numbers of the first and second embodiments.

Various changes and modifications to the constitution of the electronic exchange apparatus and the type of the extension terminal can be made without departing from the scope of the subject matter of the present invention.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic exchange apparatus comprising:

a plurality of extension circuits having terminals to which a plurality of extension terminals are connected;

a memory table including a memory area for registering a plurality of physical port numbers which correspond to said plurality of extension circuits, a plurality of logical port numbers which correspond to said plurality of physical port numbers, and a plurality of extension numbers which correspond to said plurality of extension circuits;

a control circuit for retrieving one of the extension numbers of a destination of an incoming signal from said memory table to process the incoming signal;

a change request detecting means for detecting a change request signal supplied from one of said plurality of extension terminals to request a change in contents registered in said memory table; and memory table changing means for changing a relationship between one of said physical port numbers and one of said logical port numbers registered in said memory table, based on the change request signal detected by said change request detecting means and on information supplied from one of said extension terminals and indicating the memory table contents to be changed.

2. The electronic exchange apparatus according to claim 1, wherein said memory table further includes a memory area for storing said extension number and a destination extension number to which the incoming signal of the extension number is transferred.

3. The electronic exchange apparatus according to claim 1, wherein said change request detecting means includes means for detecting at least one of a changing special number input from said extension terminals and a manager's password, as a change request signal.

4. The electronic exchange apparatus according to claim 1, wherein said memory table changing means includes means for preventing the logical port numbers from being dually registered when the contents of said memory table are changed.

5. An electronic exchange apparatus comprising:

a plurality of extension circuits having terminals to which a plurality of extension terminals are connected;

a memory table including a memory area for registering a plurality of physical port numbers which correspond to said plurality of extension circuits, a plurality of logical port numbers which correspond to said plurality of physical port numbers, and a plurality of extension numbers which correspond to said plurality of extension circuits;

a control circuit for retrieving one of the extension numbers of a destination of an incoming signal from said memory table to process the incoming signal;

a change request detecting means for detecting a change request signal supplied from one of said plurality of extension terminals to request a change in contents registered in said memory table; and memory table changing control means for, when the change request signal is detected by said change request detecting means, changing a relationship between one of said physical port numbers and one of said logical port numbers registered in said memory table, based on the change request signal and on information supplied from the one of said extension terminals and indicating the memory table contents to be changed.

6. The electronic exchange apparatus according to claim 5, wherein said change request detecting means includes means for detecting at least one of a changing special number input from said extension terminals and a manager's password, as a change request signal.

7. The electronic exchange apparatus according to claim 5, wherein said memory table changing control means includes means for preventing the logical port numbers from being dually registered when the contents of said memory table are changed.

8. An electronic exchange system comprising:
   a plurality of extension telephones having a change request input means for inputting a change request of an extension number and a change request output means for outputting a change request signal based on the change request; and
   an electronic exchange apparatus including
      a plurality of extension circuits having extension terminals to which the plurality of extension telephones are respectively connected,
      a memory table including a memory area for registering a plurality of physical port numbers, a plurality of logical port numbers and a plurality of extension numbers which respectively correspond to the plurality of extension circuits,
   a control circuit for retrieving an extension number of a destination of an incoming signal from said memory table, so as to process the incoming signal,
   change request detecting means for detecting the change request signal supplied from one of the plurality of extension terminals to request a change in contents registered in the memory table, and
   memory table changing means for changing a relationship between corresponding ones of the physical port number and the logical port number registered in the memory table, based on the change request signal detected by said change request detecting means and information which is supplied from the one extension terminal indicating a contents to be changed.

9. The electronic exchange system according to claim 8, wherein said memory table further includes a memory area for storing said extension number and a destination extension number to which the incoming signal is to be transferred.

10. The electronic exchange system according to claim 8, wherein said change request detecting means includes means for detecting at least one of a changing special number input from said extension terminals and a logical port number, as a change request signal.

11. The electronic exchange system according to claim 10, wherein said change request detecting means includes means for further detecting a manager's password as a change request signal.

12. The electronic exchange system according to claim 8, wherein said memory table changing means includes means for preventing the logical port numbers from being dually registered when the contents of said memory table are changed.

13. An electronic exchange system comprising:
   a plurality of extension telephones having a change request input means for inputting a change request of an extension number and a change request output means for outputting a change request signal based on the change request; and
   an electronic exchange apparatus including
      a plurality of extension circuits having extension terminals to which the plurality of extension telephones are respectively connected, wherein said plurality of extension telephones includes an origin extension telephone having an origin extension number corresponding to an extension telephone of primary use, and a transfer destination extension telephone having a transfer destination extension number, corresponding to one of the plurality of extension telephones to be used other than origin extension telephone,
      a transfer memory table for selectively storing extension number information representing said transfer destination extension telephone from one of an incoming transfer registration request signal, wherein said transfer registration request signal is a change request signal requesting a transfer registration that includes extension number information, and a user-inputted extension number,
      a control circuit for retrieving an extension number of a transfer destination telephone from one of an incoming transfer registration request signal and a user-inputted extension number,
      transfer registration determining means for determining whether the transfer registration request signal is a signal generated from one of said transfer destination extension telephone and origin extension telephone when said incoming transfer registration request signal is detected from at least one of the plurality of extension terminals, and
      transfer registration control means for registering the extension number information of the transfer destination telephone wherein
         if said transfer registration determining means determines that said request signal was generated by said transfer destination extension telephone, the control circuit retrieves the transfer destination extension number from the incoming transfer registration request signal and
         if said transfer registration determining means determines that said request signal was generated by said origin extension telephone, the control circuit retrieves the transfer destination extension number from said user-inputted extension number.

14. The electronic exchange system according to claim 13, wherein said transfer registration determining means includes means for detecting at least one of a changing special number input by said extension terminals and a speech signal, as a change request signal.

* * * * *